350-376 SR ENCE SEARCH ROOM
XR 3,527,577 029D
Sept. 8, 1970 G. J. FAN ET AL 3,527,577
MAGNETO-OPTICAL MATERIALS
Filed May 3, 1968 2 Sheets-Sheet 1
FIG. 1
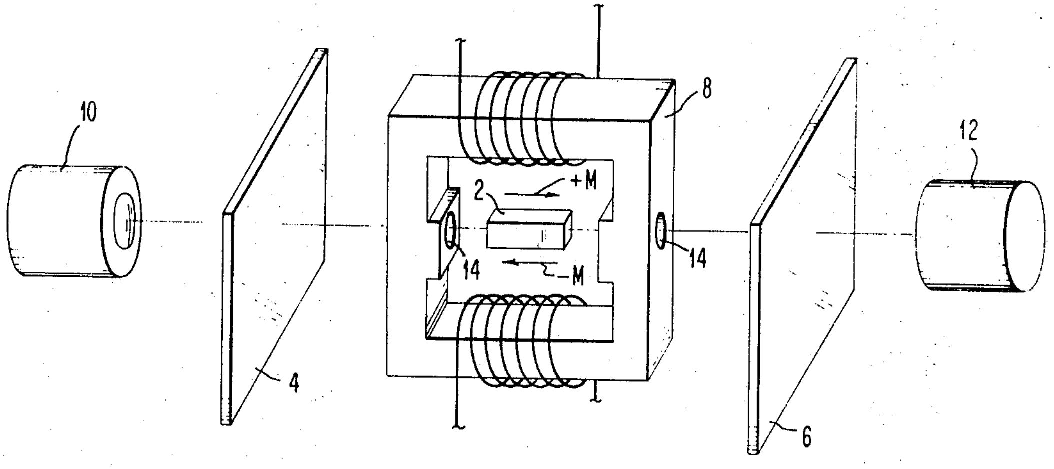
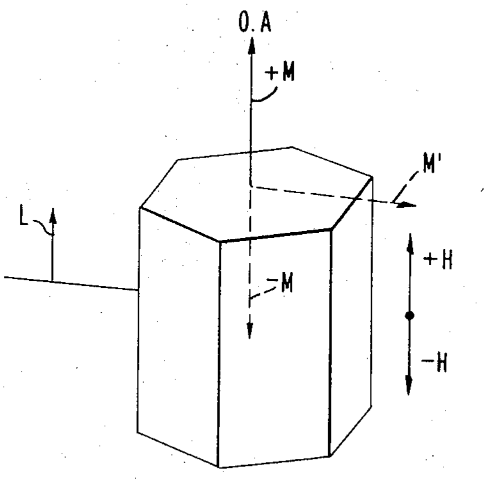
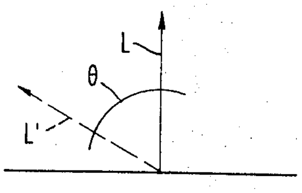
FIG. 4B
FIG. 4A
INVENTORS
BERNELL E. ARGYLE
GEORGE J. FAN
THOMAS R. MC GUIRE
MERRILL W. SHAFER
BY George Baron
ATTORNEY
3527577
OR IN 423/464

MAGNETO-OPTICAL MATERIALS

Filed May 3, 1968 2 Sheets-Sheet 2

1

3,527,577

MAGNETO-OPTICAL MATERIALS

George J. Fan, Ossining, and Thomas R. McGuire and Merrill W. Shafer, Yorktown Heights, N.Y., and Bernell E. Argyle, North Haven, Conn., assignors to International Business Machines Corporation, Armonk, N.Y., a corporation of New York Filed May 3, 1968, Ser. No. 726,282
Int. Cl. C01g *53/08;* G02f *1/22;* H01f *1/00*
U.S. Cl. 23—315 14 Claims

ABSTRACT OF THE DISCLOSURE

When part of the nickel of $RbNiF_3$ is replaced by cobalt, manganese, iron, cadmium, zinc, strontium or cobalt mixed with calcium, or with calcium and iron, the hexagonal structure and ferromagnetic order of $RbNiF_3$ are maintained, but the easy axis of magnetization is rotated from being perpendicular to the optic axis to being parallel to it. Such rotation allows the new composition to be highly suited as a magneto-optic modulator of light or as a memory element.

BACKGROUND OF THE INVENTION

Previous work on the magnetic and optical properties of the $ABF_3$ class of compounds (where A represents Na, K, Rb, Cs or Tl) and B is a divalent magnetic transition metal ion (such as Ni, Mn, Fe, Co) showed that, in general, they crystallize with the cubic or pseudo-cubic perovskite-like structure and order antiferromagnetically. However, certain writers found that $RbNiF_3$ crystallized with a hexagonal type structure which was weakly ferromagnetic or ferrimagnetic. See pp. 261–287 of an article appearing in the Z. Anorg Chem., vol. 317 (1962) by W. Rudorff et al. Other related articles are by K. Lee et al. in the Physical Review, vol. 132, p. 144 (1963) and by W. W. Holloway et al. in the 1965 Physical Review Letters, vol. 15, p. 17.

Pure $RbNiF_3$ is a hexagonal ferrimagnet which is highly transparent at visible wavelengths and shows high Faraday rotation. Consequently, such a material would normally lend itself to be used as a magneto-optical modulator or switch for visible light. However, a particularly undesirable feature of pure $RbNiF_3$ is the fact that its easy axis of magnetization is perpendicular to its optic axis. Consequently, to obtain large Faraday rotations without the deleterious effects of natural birefringence, one has to apply magnetic fields as high as 20,000 oersteds and higher, or operate the modulator with a longitudinal Faraday effect so that, in the direction of the optic axis, there is a component of magnetization. In either case, the technical difficulties involved make pure $RbNiF_3$ unattractive as a magneto-optical device.

SUMMARY OF THE INVENTION

The partial substitution of divalent cobalt or a combination of divalent calcium and cobalt for the nickel in hexagonal-type $RbNiF_3$ not only rotates the easy axis of magnetization from being perpendicular to being parallel to the optic axis, but such substitution also has the desirable effect of lowering the switching fields to very low values, i.e., 25 oersteds. While cobalt is one example of a desirable partial substitute for nickel in

2

$RbNiF_3$, other divalent transition elements, such as Mn, Fe and Cu, are capable of use as partial substitutes for the Ni in $RbNiF_3$. While Ca is also desirable as a substitutional ion for $Ni^{++}$ in $RbNiF_3$, alkaline earth metals other than Ca, such as those from Group II–A and Group II–B of the Periodic Chart of the Elements; for example Mg, Sr, Zn, Cd, etc. can be partially substituted for nickel.

Thus it is an object of this invention to provide new compositions of the form of hexagonal $RbNi_{1-x}A_xF_3$ that can be grown as high purity single crystals, or as high purity polycrystals, that are highly useful in light modulating devices, where A is either a divalent transition metal (21–29 in the Periodic Chart of the Elements) or an alkaline earth metal in Group II–A or II–B of the Periodic Chart of the Elements, or combinations of both.

The foregoing and other objects, features and advantages of the invention will be apparent from the following more particular description of preferred embodiments of the invention, as illustrated in the accompanying drawings.

DESCRIPTION OF THE DRAWINGS

FIG. 1 is a diagrammatic view of an electro-optic system using the novel magneto-optical crystals of this invention.

FIGS. 4A and 4B are drawings showing the effect of cobalt in concentration on the rotation of the easy axis of magnetization with respect to the optical axis of a hexagonal $RbNi_{1-x}A_xF_3$ crystal.

DESCRIPTION OF THE PREFERRED EMBODIMENTS

One example of a highly desirable compound of the form $RbNi_{1-x}A_xF_3$ is $RbNi_{0.75}Co_{0.25}F_3$. The latter is produced by taking 1 unit of purified RbF, 0.75 unit of $NiF_2$ and 0.25 unit of $CoF_2$ and grinding them together in a dry box to avoid contaminating the ingredients with the atmosphere. The ground particles, while still in the dry box, are pressed into pellets, placed into a platinum tube, the ends of which are pinched. The pinched tube is removed from the dry box and then sealed by fusing.

The platinum tube and its contents are put into a furnace and slowly brought from room temperature to 500–600° C., the heating process taking about 12 hours. Once the final temperature is reached, it is held at 500–600° C. for four to five hours and then quickly raised to 750° C., at which temperature it is maintained for five to six hours, and then removed from the furnace to allow the platinum tube and its contents to gradually cool to room temperature. The final product, at this stage, is a polycrystalline powder. If desired, such polycrystalline powder can be made into pellets and heat treated to obtain polycrystalline $RbNi_{0.75}Co_{0.25}F_3$ in that the latter is useful as a magneto-optic element.

The polycrystalline powder is removed from the platinum tube and placed in a platinum crucible, the latter being put into a furnace and taken quickly to 975° C. and then slowly cooled (6–8 hours) from 975° C. to about 775° C.; when the approximate temperature or 775° C. is reached, the crucible is gradually cooled (2–3 hours) to room temperature. At this stage, large single crystals are formed which are cut, polished and oriented for use as a magneto-optical element in a suitable light modulator device or system.

The compound $RbNi_{0.75}Co_{0.25}F_3$ can also be produced by reacting polycrystalline $RbNiF_3$ with polycrystalline $RbCoF_3$. The polycrystalline powders are first prepared by reacting RbF with $CoF_2$, or $NiF_2$ with RbF. Then 0.75 $RbNiF_3$ and 0.25 $RbCoF_3$ are placed in a platinum crucible and treated in the manner discussed above in describing the first method of producing $RbNi_{0.75}Co_{0.25}F_3$ to produce $RbNi_{0.75}Co_{0.25}F_3$.

Figure 2:
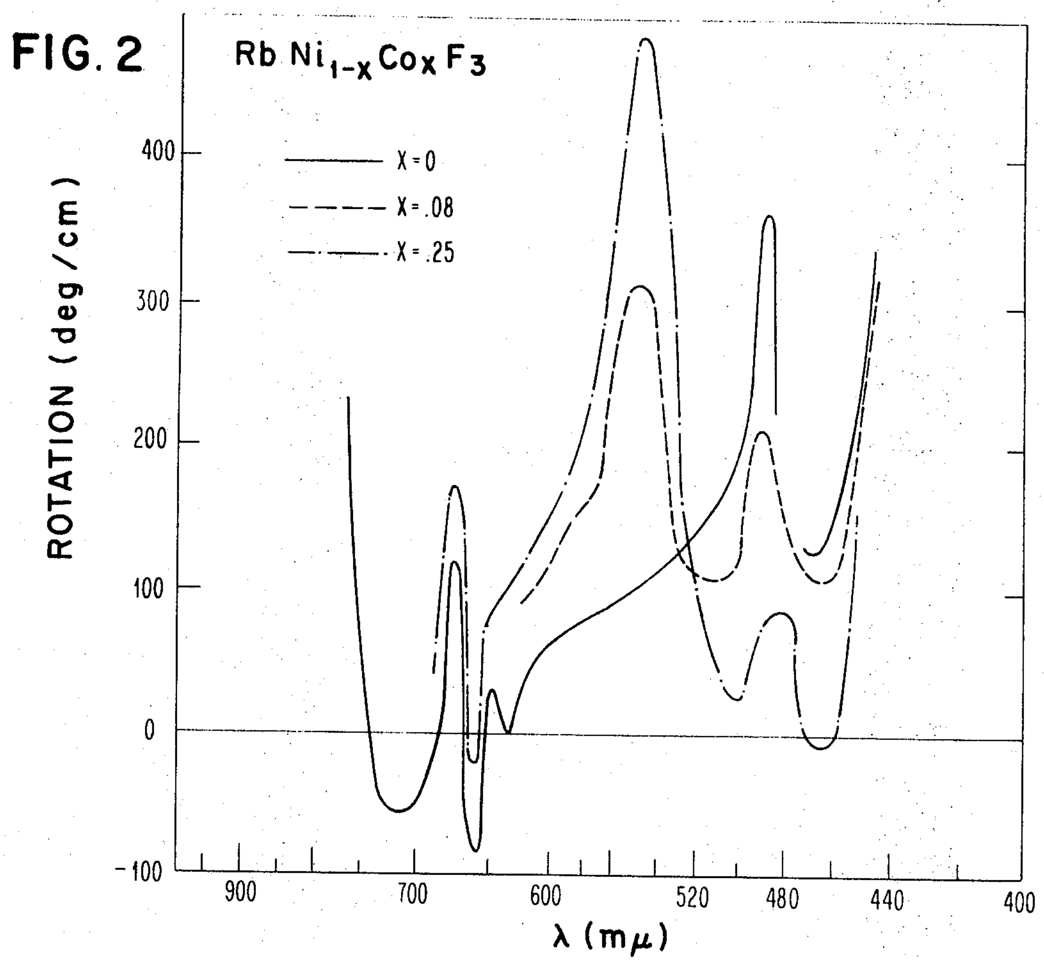
FIG. 2 is a plot of the rotation of the plane of polarization for different concentrations of Ni and Co in the hexagonal compound $RbNi_{1-x}Co_xF_3$.
Figure 3:
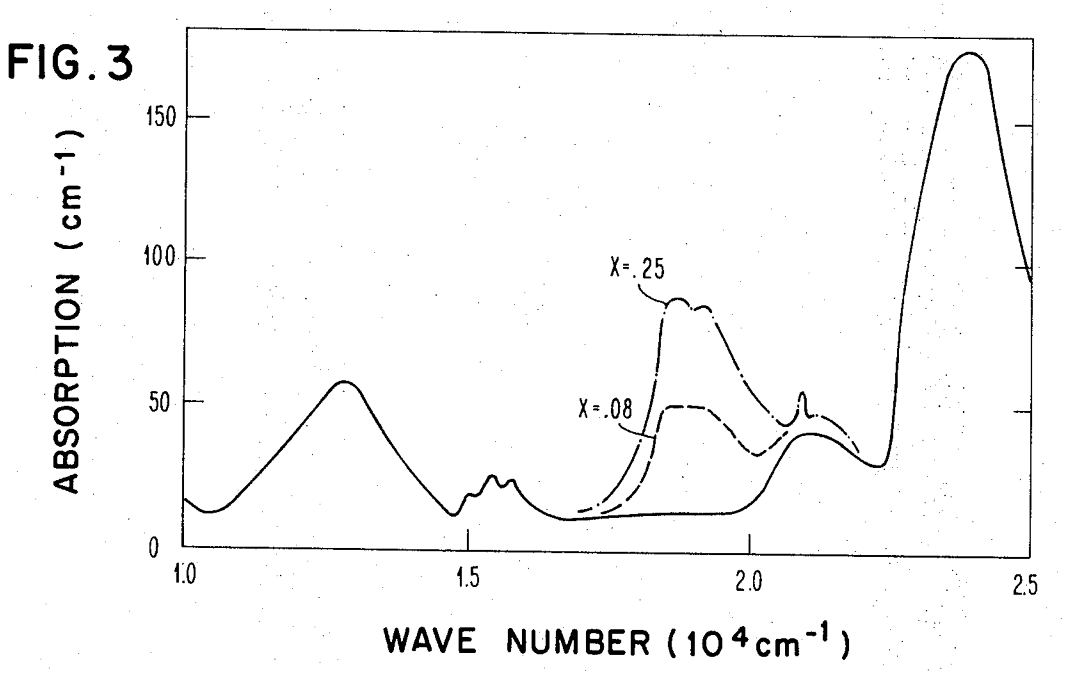
FIG. 3 is a plot of absorption V. frequency for the compound $RbNi_{1-x}Co_xF_3$ for various concentrations of Ni and Co.

FIG. 2 shows the rotation (degrees/cm.) for various compositions of $RbNi_{1-x}Co_xF_3$. The abscissa of FIG. 2 indicates the wave number or wave length of light that undergoes such rotation. It is seen that when there is no substitution of cobalt for nickel ($x=0$), the highest rotation (350 deg./cm.) takes place about 5000 A. At about 5880 A., it is less than 75 deg./cm., increasing to about 140 deg./cm. when $x=.08$ and is about 200 deg./cm. when $x$ is equal to 0.25. FIG. 3 indicates that the bulk absorption of $RbNi_{1-x}Co_xF_3$ also increases with increasing cobalt concentrations; however such increases are more than offset by the sharp increase in the Faraday effect in the visible region.

Additionally, as seen in FIG. 4A, the easy axis of magnetization M, which in $RbNiF_3$ is perpendicular (see M′) to the optic axis of $RbNiF_3$, is rotated so that for $RbNi_{0.75}Co_{0.25}F_3$, it is now parallel to the optic axis O.A. It has been ascertained that for values of $x<.07$ in the compound $RbNi_{1-x}Co_xF_3$, the easy axis of magnetization is perpendicular to the optic axis, but for values $x>0.17$, the easy axis of magnetization is parallel to the optic axis at 77° K. For values of $x$ between 0.07 and 0.17, the easy axis of magnetization is at an angle to said optic axis. The Faraday rotation $\theta$ (see FIG. 4B) for $RbNi_{0.75}Co_{0.25}F_3$ is approximately 200 deg./cm. in the visible region, and a magnetic field +H or −H of only about 25 oersteds is needed to attain such 200 deg./cm. rotation of plane polarized light L, whereas magnetic fields in excess of 20,000 oersteds were needed for the same rotation of pure $RbNiF_3$. Thus when one looks along the optic axis ($c$-axis), the natural birefringence is no longer observed for compositions of $x>.17$.

Other compounds that can be made in the manner described above for preparing $RbNi_{0.75}Co_{0.25}F_3$ are $$RbNi_{0.75}Ca_{0.25}F_3 \text{ and } RbNi_{0.75}Co_{0.10}Ca_{0.15}F_3$$

For obtaining $RbNi_{0.75}Ca_{0.25}F_3$, the mixture that is placed in the furnace and prepared in a way similar to the way $RbNi_{1-x}Co_xF_3$ is prepared is 1.0 RbF+0.75 $NiF_3$+0.25 $CaF_2$; for obtaining $RbNi_{0.75}Co_{0.10}Ca_{0.15}F_3$. 1.0 RbF is added to 0.75 $NiF_2$ and 0.10 $CoF_2$ and 0.15 $CaF_2$. In generalizing the last formula to read $$RbNi_{1-x-y}Ca_yCo_xF_3$$

changes in value of $x$ from 0.5 to 0.30 and corresponding changes in the value of $y$ produce a range of values in magnetic field of less than 25 to 40 oersteds needed to switch the sample of $RbNi_{1-x-y}Ca_yCo_xF_3$ in the direction of the optic axis. These values are negligible compared to the 20,000 oersteds needed, at about 77° K., to switch a hexagonal $RbNiF_3$ sample along the direction of the optical axis.

Other examples of substitution ions for $Ni^{++}$ in $RbNiF_3$ that have been made and tested are:

$RbNi_{1-x}Mn_xF_3$ where $0<x\leqq.50$
$RbNi_{1-x}Fe_xF_3$ where $0<x\leqq.08$
$RbNi_{1-x}Cd_xF_3$ where $0<x\leqq.20$
$RbNi_{1-x}Mg_xF_3$ where $0<x\leqq1.00$
$RbNi_{1-x}Cr_xF_3$ where $0<x\leqq.55$
$RbNi_{1-x}Zn_xF_3$ where $0<x\leqq.15$
$RbNi_{1-x}Sr_xF_3$ where $0<x\leqq.08$ The various novel compounds were X-rayed and the following patterns were obtained. Table I is for the compound $RbNi_{0.7}Co_{0.3}F_3$, Table II is for $RbNi_{0.9}Co_{0.1}F_3$, Table III is for $RbNi_{0.85}Co_{0.15}F_3$ and Table IV is for $RbNi_{0.65}Co_{0.20}Ca_{0.15}F_3$. The value of $d$ is the measured distance in angstroms between planes in a crystal using conventional X-ray diffraction measuring techniques and $I/Io$ is the intensity of a diffracted X-ray beam from such planes measured in arbitrary units where 100 is the strongest intensity and other numbers are fractions of 100.

Tables V, VI and VII are magnetic data obtained by well-known testing procedures for $RbNi_{1-x}Co_xF_3$ where $0.1\leq x\leqq0.3$, $RbNi_{1-x}Ca_xF_3$ where $0.5\leq x\leq0.25$ and $RbNi_{1-(x+y)}Co_xCa_yF_3$ for values of $x$ and $y$, at different Curie temperatures>where $0\leq x\leq0.50$ and $0\leq y\leqq0.28$ and $x+y>0$. The term $\sigma$ indicates the magnetic moment of a compound in emu/gm., where emu is measured in ergs/gauss.

X-ray data and magnetic data for $$RbNi_{(1-x-y)}Co_xCa_yF_3$$

$x=0.20$, $y=0.15$.

TABLE I $RbCo_{0.3}Ni_{0.7}F_3$

| $d$: | $I/Io$ |
|---|---|
| 4.78 | 5 |
| 3.49 | 17 |
| 2.93 | 100 |
| 2.49 | 8 |
| 2.39 | 14 |
| 2.24 | 31 |
| 2.08 | 22 |
| 2.07 | 31 |
| 1.90 | 31 |
| 1.78 | 7 |
| 1.69 | 85 |
| 1.59 | 15 |
| 1.47 | 7 |
| 1.46 | 15 |
| 1.40 | 7 |
| 1.35 | 5 |
| 1.31 | 12 |
| 1.26 | 8 |
| 1.22 | 8 |
| 1.19 | 8 |
| 1.11 | 14 |

TABLE II $RbCo_{0.1}Ni_{0.9}F_3$

| $d$: | $I/Io$ |
|---|---|
| 3.47 | 25 |
| 2.93 | 100 |
| 2.49 | 15 |
| 2.39 | 25 |
| 2.26 | 10 |
| 2.24 | 34 |
| 2.06 | 50 |
| 1.90 | 18 |
| 1.77 | 6 |
| 1.69 | 55 |
| 1.59 | 10 |
| 1.46 | 21 |
| 1.45 | 11 |
| 1.39 | 4 |
| 1.31 | 7 |
| 1.25 | 5 |
| 1.22 | 5 |
| 1.11 | 8 |

TABLE III $RbNi_{0.85}Ca_{0.15}F_3$

| d: | I/Io |
|---|---|
| 4.84 | 7 |
| 3.51 | 23 |
| 2.96 | 100 |
| 2.52 | 12 |
| 2.40 | 8 |
| 2.29 | 3 |
| 2.26 | 33 |
| 2.09 | 57 |
| 1.91 | 6 |
| 1.79 | 3 |
| 1.70 | 33 |
| 1.60 | 7 |
| 1.54 | 3 |
| 1.48 | 13 |
| 1.47 | 15 |
| 1.41 | 6 |
| 1.36 | 3 |
| 1.32 | 8 |
| 1.31 | 8 |
| 1.25 | 3 |
| 1.23 | 3 |
| 1.20 | 8 |
| 1.16 | 5 |
| 1.11 | 8 |

TABLE IV $RbNi_{0.65}Co_{0.20}Ca_{0.15}F_3$

| d: | I/Io |
|---|---|
| 4.86 | 8 |
| 3.52 | 22 |
| 2.97 | 100 |
| 2.54 | 14 |
| 2.43 | 10 |
| 2.31 | 5 |
| 2.30 | 40 |
| 2.13 | 65 |
| 1.94 | 6 |
| 1.82 | 5 |
| 1.74 | 40 |
| 1.64 | 5 |
| 1.59 | 5 |
| 1.53 | 20 |
| 1.52 | 10 |

TABLE V.—$RbNi_{1-x}CO_xF_3$

| x | $t_c$ (° K.) | σ8.2 (emu/gm.) |
|---|---|---|
| 0.1 | 130 | 20.0 |
| 0.2 | 119 | 22.1 |
| 0.33 | 110 | 23.1 |
| 0.51 | 101 | 25.4 |
| 0.7 | 993 | 27.3 |

TABLE V.—$RbNi_{1-x}Ca_xF_3$

| x | $t_c$ (° K.) | σ8.2 (emu/gm.) |
|---|---|---|
| 0.05 | 118 | 23.5 |
| 0.10 | 108 | 24.4 |
| 0.15 | 91 | 25.0 |
| 0.25 | 68 | 26.6 |

TABLE VII.—$RbNi_{1-(x+y)}Co_xCa_yF_3$

| x | y | $t_c$ (° K.) | (emu/gm.) |
|---|---|---|---|
| 0.20 | 0.11 | 85 | 27.1 |
| 0.20 | 0.08 | 91 | 22.6 |
| 0.20 | 0.15 | 60 | 28.2 |

The substitution of a divalent transition metal or a divalent alkaline earth metal, or both, for the $Ni^{++}$ in single crystals of hexagonal $RbNiF_3$ produces a highly desirable material that is particularly useful in magneto-optic devices, and as a bistable memory element, i.e., with the application of a magnetic field along an axis in one direction magnetizing the sample in that direction and would represent the storage of a "1" and such storage state could be sensed by a large rotation of polarized light passing through the material. The storage of "0" could be represented by the sample magnetized in the opposite direction and could be sensed by an opposite rotation of polarized light, i.e., the initial conditions set for the plane of polarization. As seen in FIG. 1, a crystal 2 of $RbNi_{1-x}Co_xF_3$, or its equivalent, is located between spaced crossed polarizing filters such as polarizer 4 and analyzer 6. Crystal 2 is placed in a magnetic field produced by an electromagnet 8. A light source 10 and light detector unit 12 is so disposed that the detector 12 senses polarized light that is rotated by a magnetic field in the +M direction, but does not detect polarized light that is rotated by a magnetic field in the −M direction. The light from source 10 passes through openings 14 in the electromagnet 8 prior to entering and after passing through crystal 2.

A single crystal 2 of $RbNi_{0.9}Co_{0.1}F_3$ in the shape of a parallelepiped 6 mm. long and 1 $mm.^2$ in cross section was used as a light modulator up to frequencies of 100,000 cycles per second.

The specimen was cut so the optic or *c*-axis was along the long axis. It was mounted in an evacuated chamber in a holder cooled by liquid nitrogen (77° K.) and a 40 turn coil of #34 wire was wound around the sample. The coil was energized by a high frequency oscillator. Using the experimental set up shown in FIG. 1, where the electromagnet 8 is replaced by a coil, the light source 10 was monochromatic (5995 A.), and the detector 12 was a photomultiplier tube. Modulations from D.C. to 100,000 cycles per second were observed. At 100,000 cycles per second, a modulating field of ±8 gauss peak to peak was used and about 10% of the sample was switched.

Although a frequency of 100,000 cycles per second was used to demonstrate the operation of these new materials as magneto-optical elements, it should be understood that such elements can be used at frequencies limited only by the switching speeds of the materials. Such speeds are of the order of nanoseconds or less.

These new compounds experience a drop in Curie temperature. For example, in the compound $RbNi_{1-x}Co_xF_3$, the Curie temperature drops linearly from 136° K. when $x=0$ to 115° K. when $x=0.25$. In compounds such as $$RbNi_{1-x}Mg_xF_3,\ RbNi_{1-x}Ca_xF_3,\ RbNi_{1-x}Zn_xF_3,$$

$RbNi_{1-x}Sr_xF_3$, $RbNi_{1-x}Cd_xF_3$, one obtains a composition having a hexagonal structure whose magnetic and optical properties will vary. In general, Curie temperatures are all lowered in these compounds compared to their parent pure compounds, but to a lesser extent when magnetic ions $Co^{++}$, $Mn^{++}$ and $Fe^{++}$ are substituted for $Ni^{++}$. Magnetic moments for the noted compounds increase for those that contain the substituted $Ca^{++}$ and $Cd^{++}$ ions for the $Ni^{++}$ ions.

Additionally, another compound that has very desirable magneto-optical characteristics is $$RbNi_{1-(x+y+z)}Co_xFe_yCa_zF_3$$

where $x$ varies from 0 to .50, $y$ from 0 to .20 and $z$ from 0 to .28.

The novel compounds cited above can be grown as single crystals having hexagonal structure and capable of wide use as magneto-optical elements; such elements serving as light modulators, memory units, or capable of use wherever high rotations of polarized light are desired using relatively low magnetic fields for achieving such high rotations.

What is claimed is:

1. A composition of matter consisting of $RbNi_{1-x}A_xF_3$ where A is selected from one of the divalent transition metals consisting of cobalt, manganese and iron and the values of $x$ for the metals varies as follows: for cobalt, $0.17 \leq x \leq 0.50$; for manganese, $0 < x \leq 0.50$; and for iron, $0 < x \leq 0.08$.

2. A composition of matter consisting of $RbNi_{1-x}A_xF_3$ where A is selected from one of the metals consisting of calcium, strontium, zinc, cadmium and chromium and the values of $x$ vary as follows: for calcium, $0.05 \leq x \leq 0.25$; for strontium, $0 < x \leq 0.08$; for zinc, $0 < x \leq 0.15$; for cadmium, $0 < x \leq 0.20$; and for chromium, $0 < x \leq 0.55$.

3. A hexagonal structured single crystal of $$RbNi_{1-x}A_xF_3$$

where A is cobalt and $0.17 \leq x < 0.50$.

4. A hexagonal structured single crystal of $$RbNi_{1-x}A_xF_3$$

where A is calcium and $0.05 \leq x \leq 0.25$.

5. A hexagonal structured crystal of $RbNi_{1-x}Co_xF_3$ where $0.17 < x \leq 0.50$.

6. A single crystal of $RbNi_{0.65}Co_{0.20}Ca_{0.15}F_3$.

7. A single crystal of $RbNi_{1-(x+y)}Co_xCa_yF_3$ where $0 < x \leq .50$ and $0 < y \leq .28$.

8. The compound $RbNi_{1-x}Mn_xF_3$ where $0 < x \leq 0.50$.

9. The compound $RbNi_{1-x}Fe_xF_3$ where $0 < x \leq 0.08$.

10. The compound $RbNi_{1-x}Cd_xF_3$ where $0 < x \leq 0.20$.

11. The compound $RbNi_{1-x}Zn_xF_3$ where $0 < x \leq 0.15$.

12. The compound $RbNi_{1-x}Sr_xF_3$ where $0 < x \leq 0.08$.

13. The compound $RbNi_{1-(x+y+z)}Co_xFe_yCa_zF_3$ where $0 < x \leq 0.50$, $0 < y \leq 0.20$ and $0 < z \leq 0.28$.

14. A magneto-optical element consisting essentially of a crystal of $RbNi_{0.65}Co_{0.20}Ca_{0.15}F_3$.

References Cited

Holloway et al.: "Physical Review Letters," vol. 15 (1), July 1965, pp. 17–19.

Holloway et al.: "Journal of Chemical Physics," vol. 45 (2), July 1966, pp. 639–643.

Boky et al.: "Solid State Communications," vol. 5, pp. 927–931 (1967).

HELEN M. McCARTHY, Primary Examiner

J. COOPER, Assistant Examiner

U.S. Cl. X.R.

23—88; 252—62.51; 350—151